US012000287B2

(12) United States Patent
Bricio Arzubide (10) Patent No.: US 12,000,287 B2
(45) Date of Patent: Jun. 4, 2024

(54) EXTERNAL COMBUSTION ROTARY ENGINE

(71) Applicant: Alvaro Fabian Bricio Arzubide, Guadalajara (MX)

(72) Inventor: Alvaro Fabian Bricio Arzubide, Guadalajara (MX)

( * ) Notice: Subject to any disclaimer, the term of this patent is extended or adjusted under 35 U.S.C. 154(b) by 0 days.

(21) Appl. No.: 18/024,275

(22) PCT Filed: Nov. 13, 2020

(86) PCT No.: PCT/MX2020/050041
§ 371 (c)(1),
(2) Date: Mar. 2, 2023

(87) PCT Pub. No.: WO2021/194330
PCT Pub. Date: Sep. 30, 2021

(65) Prior Publication Data
US 2023/0243261 A1 Aug. 3, 2023

(30) Foreign Application Priority Data

Mar. 23, 2020 (MX) .................... MX/a/2020/003281

(51) Int. Cl.
*F01C 3/04* (2006.01)
*F01C 20/02* (2006.01)
(Continued)

(52) U.S. Cl.
CPC ................ *F01C 3/04* (2013.01); *F01C 20/02* (2013.01); *F01C 20/24* (2013.01); *F01C 21/04* (2013.01); *F01C 21/0809* (2013.01); *F01C 21/0827* (2013.01); *F01C 21/0836* (2013.01); *F01C 21/18* (2013.01)

(58) Field of Classification Search
CPC .......... F01C 3/04; F01C 1/3448; F01C 20/02; F01C 20/24; F01C 21/04; F01C 21/0809; F01C 21/0827; F01C 21/0836; F01C 21/18
See application file for complete search history.

(56) References Cited

U.S. PATENT DOCUMENTS 2,070,606 A 2/1937 Lickfeldt

FOREIGN PATENT DOCUMENTS

DE 10110261 A1 5/2002
EP 2394023 B1 * 3/2013 .............. F01C 1/063
(Continued)

*Primary Examiner* — Mary Davis (57) ABSTRACT

The present invention describes an external combustion rotary engine, which, due to the separate combustion chamber of the engine, is possible the operation at a lower temperature than those internal combustions, therefore, the engine efficiency is greater. Another characteristic presented by the external combustion rotary engine is that it has concentric expansion chambers and through cams that have a rotor, it is possible to take advantage of the expansion force of the working fluid. The external combustion rotary engine is of closed-cycle operation, so the consumption of additional water is reduced as work fluid since the amount of water within the system is sufficient. Finally, it is worth mentioning that the external combustion rotary engine, thanks to its operation principle, can be applied in the electric power generation field.

16 Claims, 7 Drawing Sheets

(51) Int. Cl.
*F01C 20/24* (2006.01)
*F01C 21/04* (2006.01)
*F01C 21/08* (2006.01)
*F01C 21/18* (2006.01)

(56) References Cited

FOREIGN PATENT DOCUMENTS

| | | |
|---|---|---|
| WO | WO9516850 A1 | 6/1995 |
| WO | WO2015012677 A | 9/2021 |

* cited by examiner

EXTERNAL COMBUSTION ROTARY ENGINE

TECHNICAL FIELD OF THE INVENTION

The present invention is related to the technical field of mechanics, thermal energy, thermodynamics, energy transfer, and physics since it provides an external combustion rotary engine.

BACKGROUND OF THE INVENTION

The types of engines that exist today come from different advances in different fields of science. However, it is well known that the first existing motor form was using steam. They drive our lives, from cars, heavy and light machinery, ships, and trains. They have transformed our world and have even taken us to space, and so are the engines.

The Steam Machine marked the beginning of the industrial revolution freeing humanity from total dependence on primary energy sources such as wind, water, and muscle. The different advances developed different types of engines that adjusted to the different needs of the time.

In steam engines the heat source is external, that is, combustion does not occur inside the cylinder or the turbine, so they are considered external combustion engines, and transform caloric energy into mechanical energy.

In traditional external combustion engines, the fuel is burned in a fireplace, producing in a boiler the steam that acts in the form of active fluid and acts the pistons, if it is an alternative engine, or the blades of the turbine if It is a rotating engine. The steam, after the expansion, can condense and return to the boiler.

The first attempts to take advantage of external combustion engines for road locomotion date back to the beginning of the 19th century; However, internal combustion engines were definitively imposed at the beginning of the 20th century. In the seventies, steam engines are still used, in some countries, for rail traction and preferred, in fixed facilities, by the possibility of using cheap fuels such as coal, heavy oils, etc.

In nuclear external combustion engines, heat is obtained by taking advantage of the energy developed by a nuclear reaction. In some cases (closed cycle turbines and nuclear plants), an intermediate fluid is used for the transmission of the heat of the source to the active fluid.

A technical search was performed on external combustion rotating engines, where it was found that different engines have been developed for this purpose, as mentioned in the publication of the U.S. Pat. No. 8,511,060 (B1), with a publication date of Aug. 20, 2013, which has the title "EXTERNAL COMBUSTION ENGINE WITH GENERAL WHEEL ROTATION ENGINE", which describes systems, devices, devices, and methods of a general wheel rotation power engine to use an element of generation, storage and pressure control; A pressure conversion into a unit of rotation force with inverse and neutral capacity and components to transfer said rotation force to an accumulator/multiplier of power by which the useful rotation force can be applied to various applications. The pressure can be generated from an internal combustion engine, a pressurized air source, and the like.

As can be seen, the aforementioned document describes an external combustion engine but shows no evidence that it is a completely rotating engine, since it mentions having a piston for the operation of the same, on the other hand, an engine that is shown to be preferably internal combustion, since it mentions that combustion is direct on its components.

On the other hand, the patent number EP0311248 (B1) was found, with a publication date of May 6, 1992, which has as its title "ROTATION MACHINE", which mentions a steam machine of the rotary type that includes a housing with two annular chambers, each chamber has an operable piston set inside. Piston sets are transported by a common axis and displaced at 90° separation. Each piston set includes two pistons. The pistons have their separate final surfaces at 180° of rotation. The rotor axis is hollow along a part of its length. The hollow portion of the fluid supplies under pressure from an external source through channels inside the pistons to fluid channels on the circumferential surfaces of the annular chambers. Additional channels in annular chambers and housing provide pressurized fluid to drive the valves of Injection in specific rotation locations of the pistons in each chamber. Each chamber includes lateral wall vents for the work fluid exhaust used. A screen is placed vertically between adjacent vents to make the condensate go to a severity collection sink.

Finally, the patent number IN188886 (B1) was found, with a publication date of Nov. 16, 2002, and which has as its title "ROTARY MOTOR OF EXTERNAL COMBUSTION FOR ENERGY GENERATION", which explains that it has a hollow cylinder of Circular, rectangular or oval form with pistons rigidly united with the gear, and rigidly united pistons with another gear to transfer mechanical energy to the transmission axis through the gears, some input ports provided in a hollow cylinder to supply gas/steam pressure, and an exit port to release gas/steam, in which the power race and the exhausting race are completed in half, and the function of the piston as a relay team, pistons set to move to the other set of pistons The previous documents describe rotating-type engines but do not show evidence of being completely rotational, since their rotor is certainly fed by pressure fluids, but, to transmit the mechanical movement mainly using pistons, they do not refer to operating with few amounts of water for not being closed systems that keep the operation fluid in recirculation.

PURPOSE OF THE INVENTION

It is, therefore, the object of the present invention, to provide an external combustion rotary engine, which solves the aforementioned problems.

BRIEF DESCRIPTION OF THE FIGURES

The characteristic details of this new external combustion rotary engine are clearly shown in the following description and the accompanying figures, as well as an illustration of that, and following the same reference signs to indicate the parts shown. However, these figures are shown as an example and should not be considered as limiting for the present invention.

DETAILED DESCRIPTION OF THE INVENTION

For a better understanding of the invention, then the parts that make up the external combustion rotary engine are listed:
1. Housing
2. Rotor
3. Impulse track
4. Guide
5. Track
6. Lubricating crest
7. Track cams
8. Expansion track
9. Vacuum track
10. Compression track
11. Cooling vein
12. First stator
13. Boreholes
14. Means of fastening
15. Engine Shaft
16. Collar
17. Mechanical seal
18. Steam ducts
19. Condensate ducts
20. Cooling duct
21. Compression cylinders
22. Springs
23. Container
24. Coupling arm
25. Valve ducts
26. Piston ducts
27. Oblique seal
28. Piston lubrication duct
29. Transfer ducts
30. Bearings
31. Engine base
32. Check valve.
33. Deflector
34. Hopper
35. Crest lubrication ducts
36. Socket head screws
37. Second stator
38. Piston Regarding the figures, the external combustion rotary engine is made up of at least one housing (1) that is preferably cylindrical with a hole in the center, and that is hollow in the upper part, configured to accommodate a rotor (2) that is preferably circularly with a hole in the center.

The rotor (2) has an impulse track installed at the top (3), an expansion track (8), a vacuum track (9), and a compression track (10), which are aligned in a concentric way, where, the impulse track (3) is located on the outer periphery of the rotor (2), then the expansion track (8) is located, followed by the vacuum track (9) and on the internal periphery of the rotor (2) the compression track is located (10).

At least, a guide (4), which is preferable for high relief, is installed on each side of the impulse track (3), the expansion track (8), the vacuum track (9), and the compression track (10), and its configuration forms a channel on the rotor tracks (2).

At least, two-track cams (5) are installed equidistantly in all the upper parts of the impulse track (3), the expansion track (8), the vacuum track (9), and the compression track (10).

A lubricating crest (6), which is preferably prismatic, is installed at the top of the track cams (5), and is configured to house inside a lubricant fluid; At least, two guide cams (7) are installed on the external sides of the guides (4) in alignment with track cams (5).

At least, a cooling vein (11), which is preferably a cylindrical perforation that crosses the rotor thickness (2) installed on the side of each of the guides (4), of the tracks of said rotor (2), and is configured to introduce a coolant to control the temperature.

At least, two stators called the first stator (12) and second stator (37), which are preferably circularly with a hole in their center, are installed at the top of the housing (1), the first stator (12) is configured to assemble its lower part with the guides (4) and with the lubricating crest (6) of the track cams (5), this configuration allows to form airtight cameras within the rotor tracks (2); The second stator (37) is installed at the top of the first stator (12) that is installed in the housing (1).

The housing (1), the first stator (12), and the second stator (37) have a plurality of boreholes (13) in their periphery, which crosses all their thickness, configured to introduce in each of them, a means of fastening (14); With this configuration, a hermetic closure is made between the housing (1) the first stator (12) and the second stator (37).

An engine shaft (15) is installed by crossing the housing (1), the rotor (2), the first stator (12), and the second stator (37) employing their respective central holes; A collar (16) is fixed in the shaft (15) in the central part of the rotor (2), with this configuration the rotor rotation (2) is transmitted to the engine shaft (15).

At least, a mechanical seal (17) was installed in the central hole of the housing (1) and in the central hole of the second stator (37) where the engine shaft (15) is located, this configuration allows hermetically sealing the parts in motion and avoid leaks of the fluids that are in circulation within the external combustion rotary engine.

At least, two steam ducts (18), which are preferably cylindrical perforations that cross the thickness of the first stator (12) and the second stator (37), are installed equidistantly in the direction of the impulse track (3) and are configured to supply a high-pressure fluid within the external combustion rotary engine.

At least, two condensate ducts (19), which are preferably cylindrical perforations that cross the thickness of the first stator (12) and the second stator (37), are installed equidistantly in the direction of the compression track (10) and are configured to download the condensate fluids of the external combustion rotary engine and deposit it in a steam generation system (not illustrated).

At least, a cooling duct (20), which is a preferably cylindrical perforation is placed aligned between the first stator (12) and the second stator (37) crossing its thickness, configured to supply refrigerant fluid to the cooling vein (11) When it coincides during the rotor turn (2) with said cooling pipe (20).

At least, two prismatic pistons (38), preferably rectangular, are installed at the bottom of the first stator (12) in an equidistant way and aligned in each of the impulse tracks (3), of expansion track (4) of vacuum track (9) and compression track (10); Each piston (38) is made up of a container (23), which is encapsulated in the lower part of the first stator (12), and is configured to perform a reciprocating movement when the track cam (5) approaches that container (23) for the rotor turn (2); At least, two compression cylinders (21) are housed inside the container (23), and are fixed at the bottom of the first stator (12) by means of socket head screws (36), this configuration allows to keep compression cylinders (21) in a single position; A spring (22), is installed inside each compression cylinder (21), this configuration allows to keep the container (23) in continuous contact with the impulse track (3), the expansion track (8), the vacuum track (9) and the compression track (10), and at the same time, give movement to the container (23).

Valve conduits (25) are installed at the bottom of the compression cylinders (21) which are aligned to container ducts (26) that are installed at the bottom of the container (23), this configuration allows the fluid input or output between the different tracks, when the containers (23) passes through the track cams (5) and the valve ducts (25) are aligned with the piston ducts (26).

A check valve (32) is installed at the bottom of compression cylinders (21), this configuration allows you to remove fluid leaks when the valve duct (25) and piston ducts (26) are aligned for the transfer of fluids.

A deflector (33) is installed at the bottom of the piston (38) and is configured to keep that piston (38) together with the rotor tracks (2) with the help of the pressurized fluid and avoid pressure leaks from a track to another.

A coupling arm (24) is installed at each of the side ends of the containers (23) of the pistons (38) and is configured to assemble with the guides (4), this configuration allows keeping the pistons (38) in their position during the rotor turn (2), as well as uploading the pistons (38) when the guide cams (7) approach the rotor rotation (2) and climb to pass on the track cams (5).

An oblique seal (27) is diagonally installed at the bottom of the internal part of the containers (23) so that the compression cylinders (21) are placed on said oblique label (27), said oblique seal (28) is configured to interact with track cams (5) when containers (23) rise or fall, and thus avoid the passage of fluids to compression cylinders (21).

A piston lubrication duct (28) is installed at the top of the pistons (38), configured to lubricate the movement of the containers (23) and the springs (22).

Transfer ducts (29) are installed in the first stator (12) and are configured to transfer fluids using the pistons (38) of the impulse track (3) to the expansion track (8), from the expansion track (8) to the vacuum track (9) and from the vacuum track (9) to the compression track (10).

A plurality of bearings (30) is installed between the rotor (2) and the housing (1), configured to facilitate the rotation of said rotor (2) and reduce friction during the operation.

Crest lubrication ducts (35) are installed in the first stator (12) and the second stator (37) in alignment with the lubricant crest (6), and are configured to constantly maintain a lubricant fluid on said lubricant crest (6) and lubricate the lower part of the containers (23) when the track cams (5) passes under these containers (23) and keep them lubricated for a better operation.

An engine base (31) is placed around the housing (1), the first stator (12), and the second stator (37) to stick and ensure the assembly between these parts, which allows the positioning of the rotary engine of external combustion on a surface or structure for operation.

A hopper (34) is installed on the outside of the second stator (37) next to the engine base (31), said hopper has a hole in its center, through which the engine shaft passes (15), and is configured to isolate the components that are connected.

The fastening means (14) can be screws, studs, asparagus, and/or a combination of the previous ones.

The steam generation system (not illustrated) can be a boiler or a steam generator.

Figure 1:
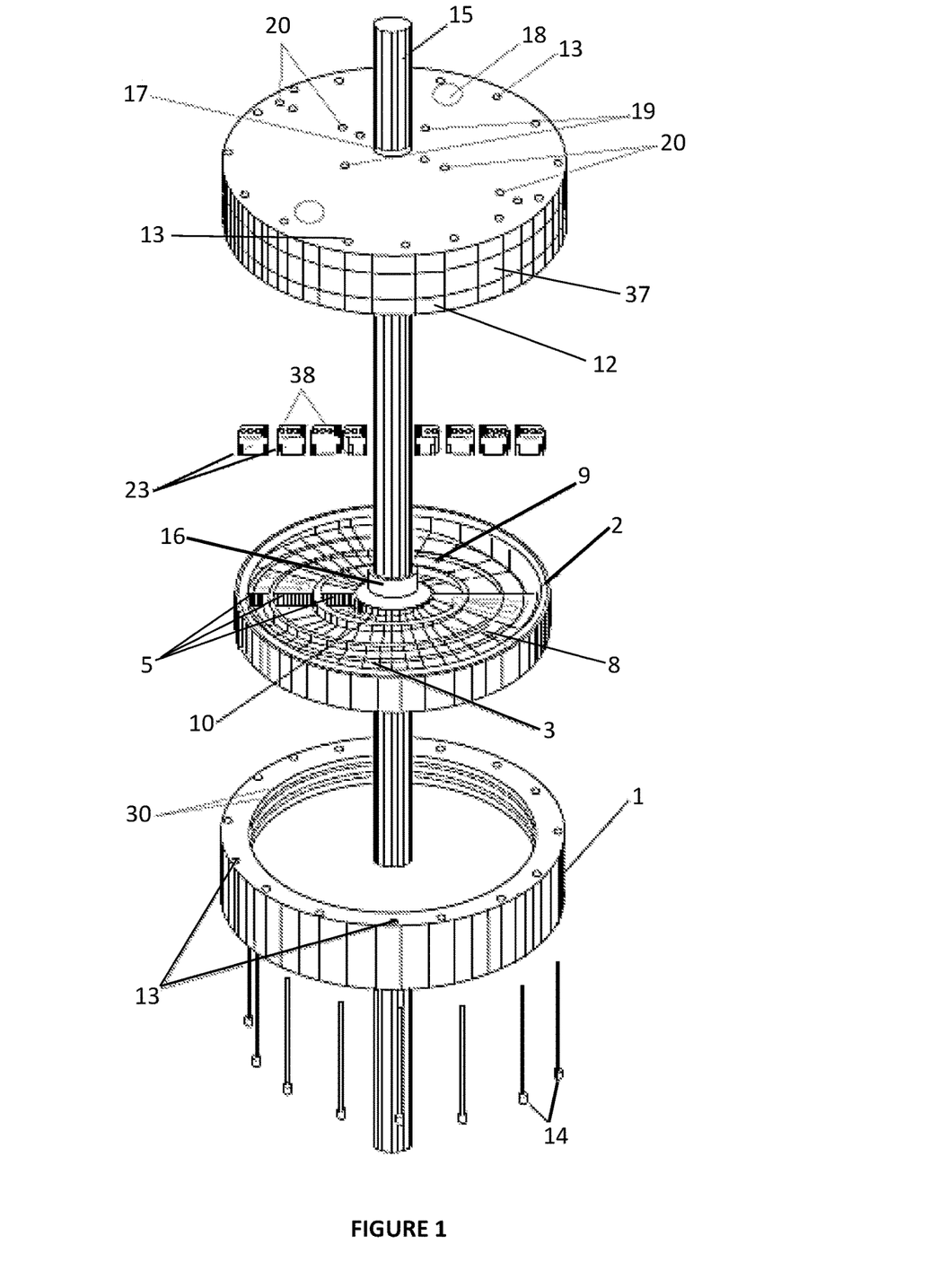
FIG. 1 shows an exploded perspective view of the parts that make up the external combustion rotary engine.
Figure 2:
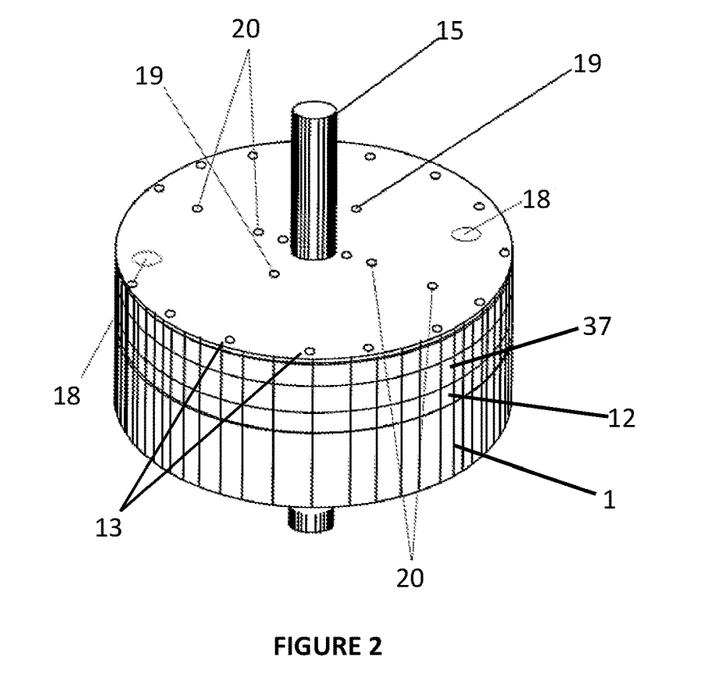
FIG. 2 shows an upper-perspective view of the external combustion rotary engine.
Figure 3:
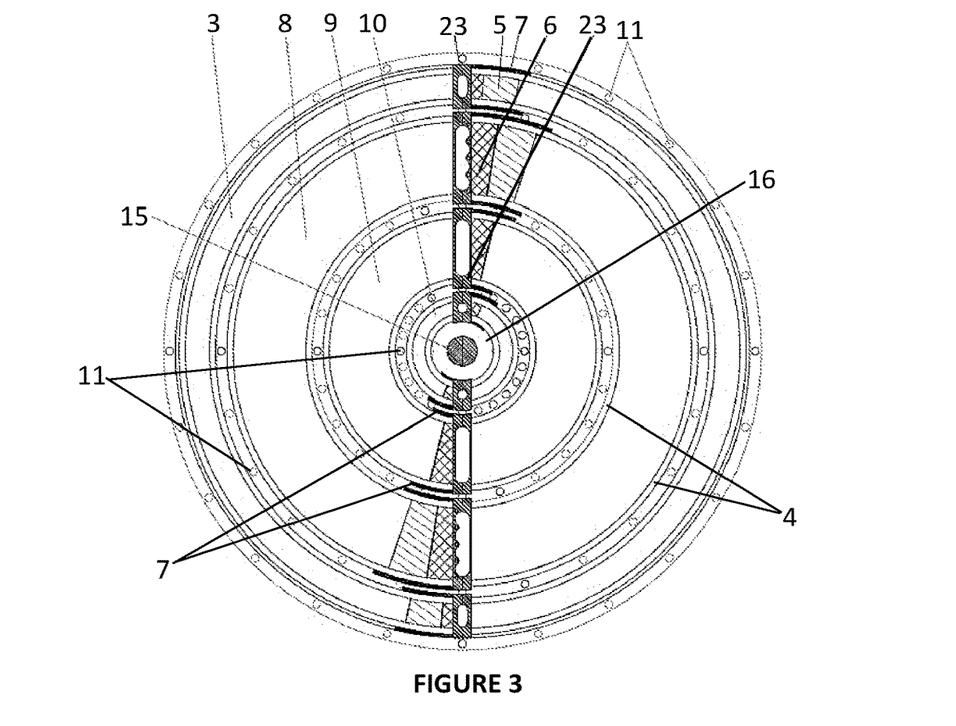
FIG. 3 shows an upper view of the external combustion rotary motor.
Figure 4:
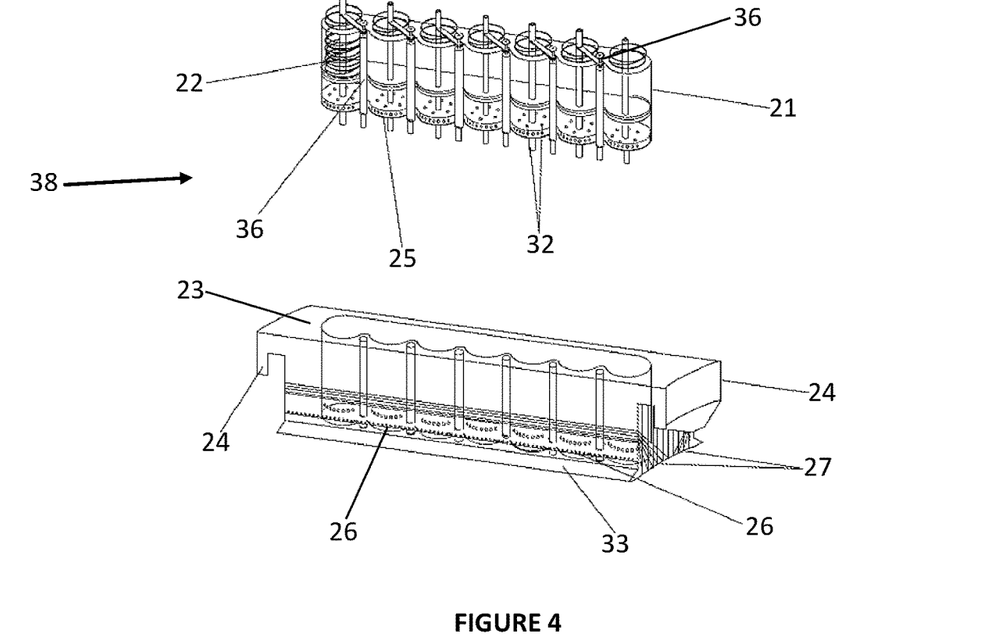
FIG. 4 shows a detailed exploded view of parts of the external combustion rotary engine.
Figure 5:
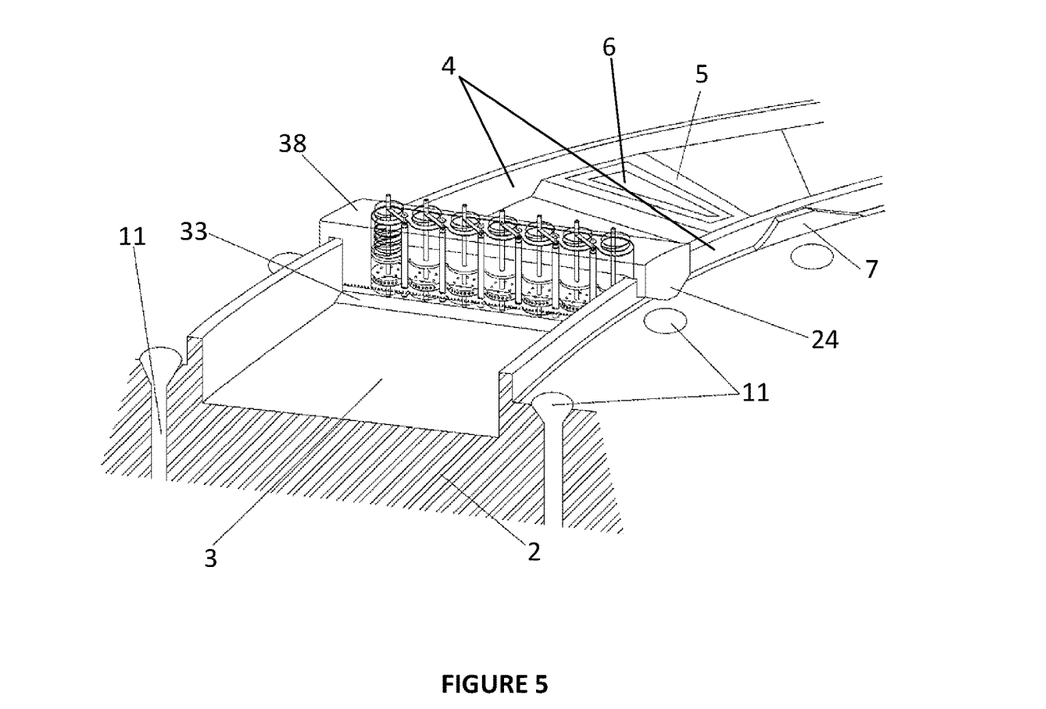
FIG. 5 shows a detailed view of the piston assembly on an external combustion rotary motor track.
Figure 6:
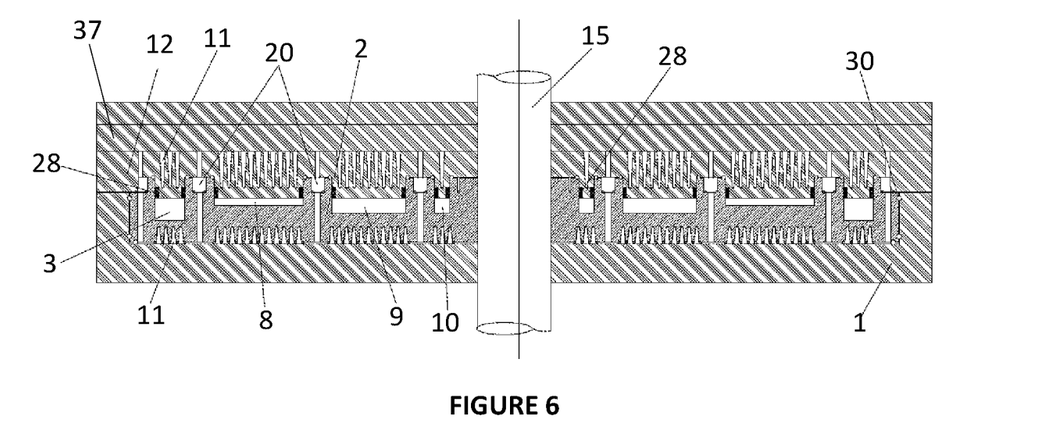
FIG. 6 shows a view of the cross-section of the external combustion rotary engine.
Figure 7:
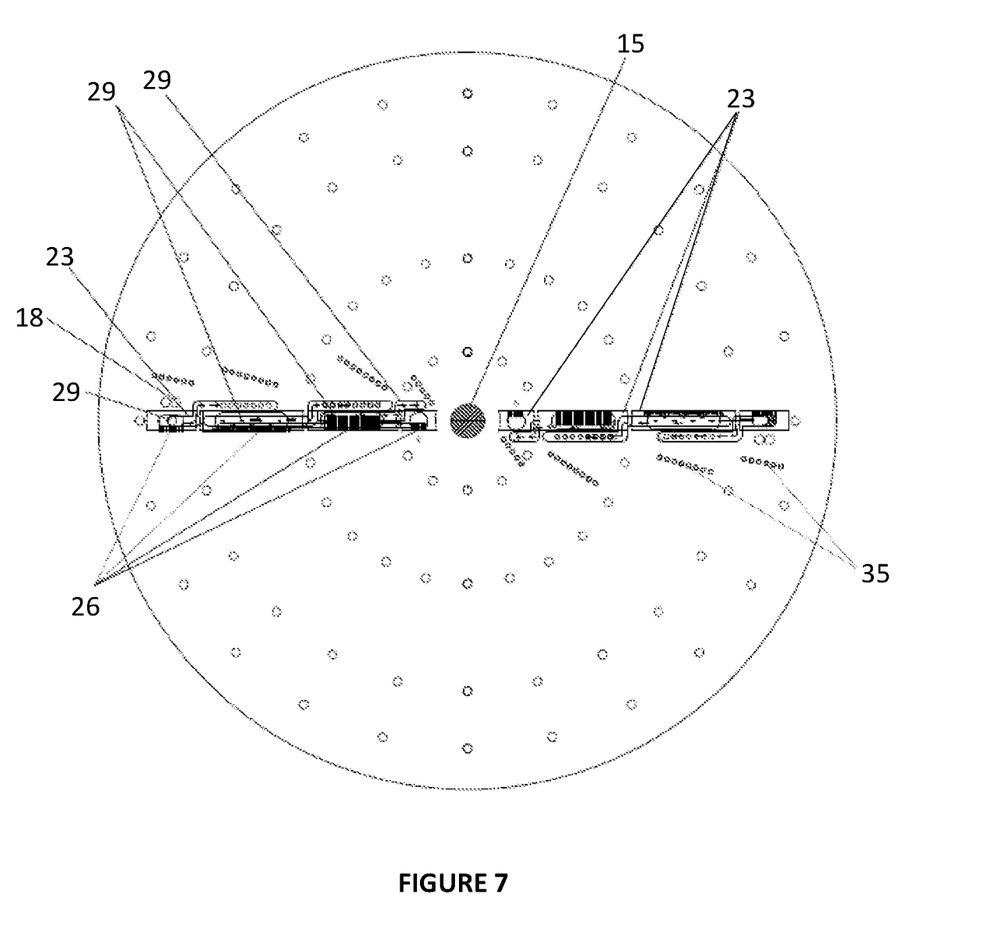
FIG. 7 shows an upper view of the stator with the fluid transfer pipelines of the external combustion rotary engine.
Figure 8:
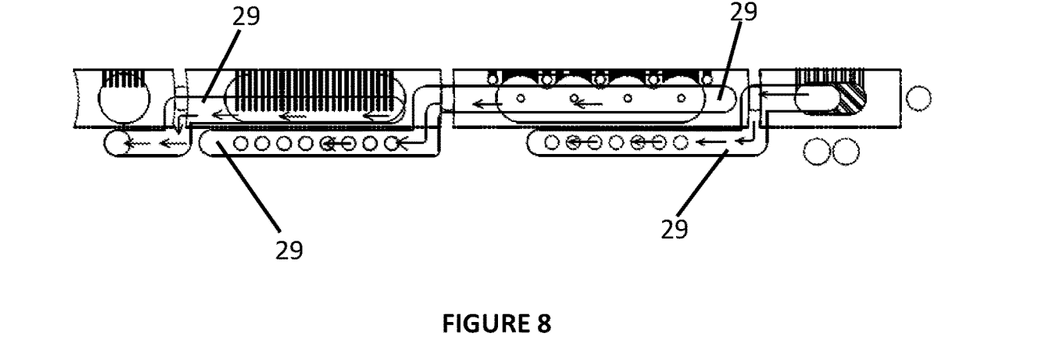
FIG. 8 shows a detailed view of external combustion rotating fluid transfer pipelines.
Figure 9:
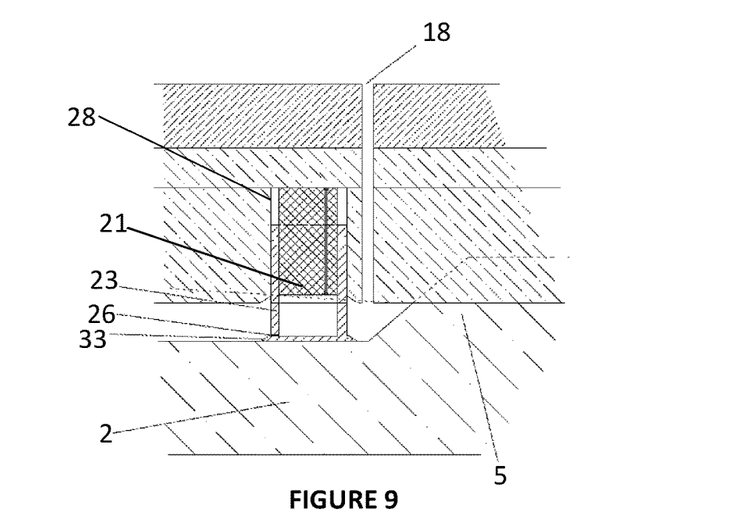
FIG. 9 shows a view in detail of the piston and the external combustion rotary engine rotor.
Figure 10:
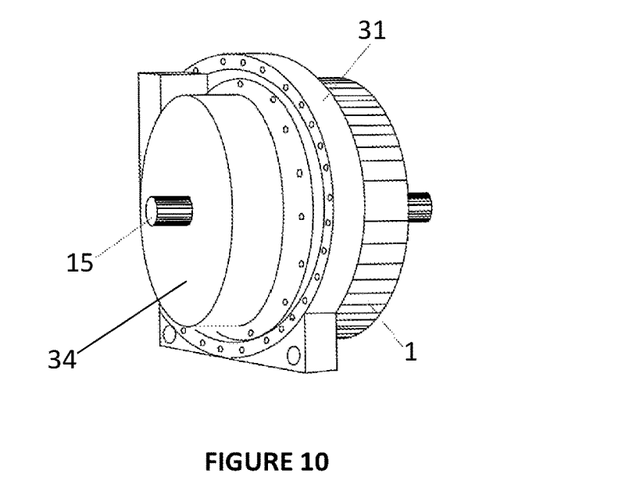
FIG. 10 shows a lateral perspective view of the external combustion rotary engine.
Figure 11:
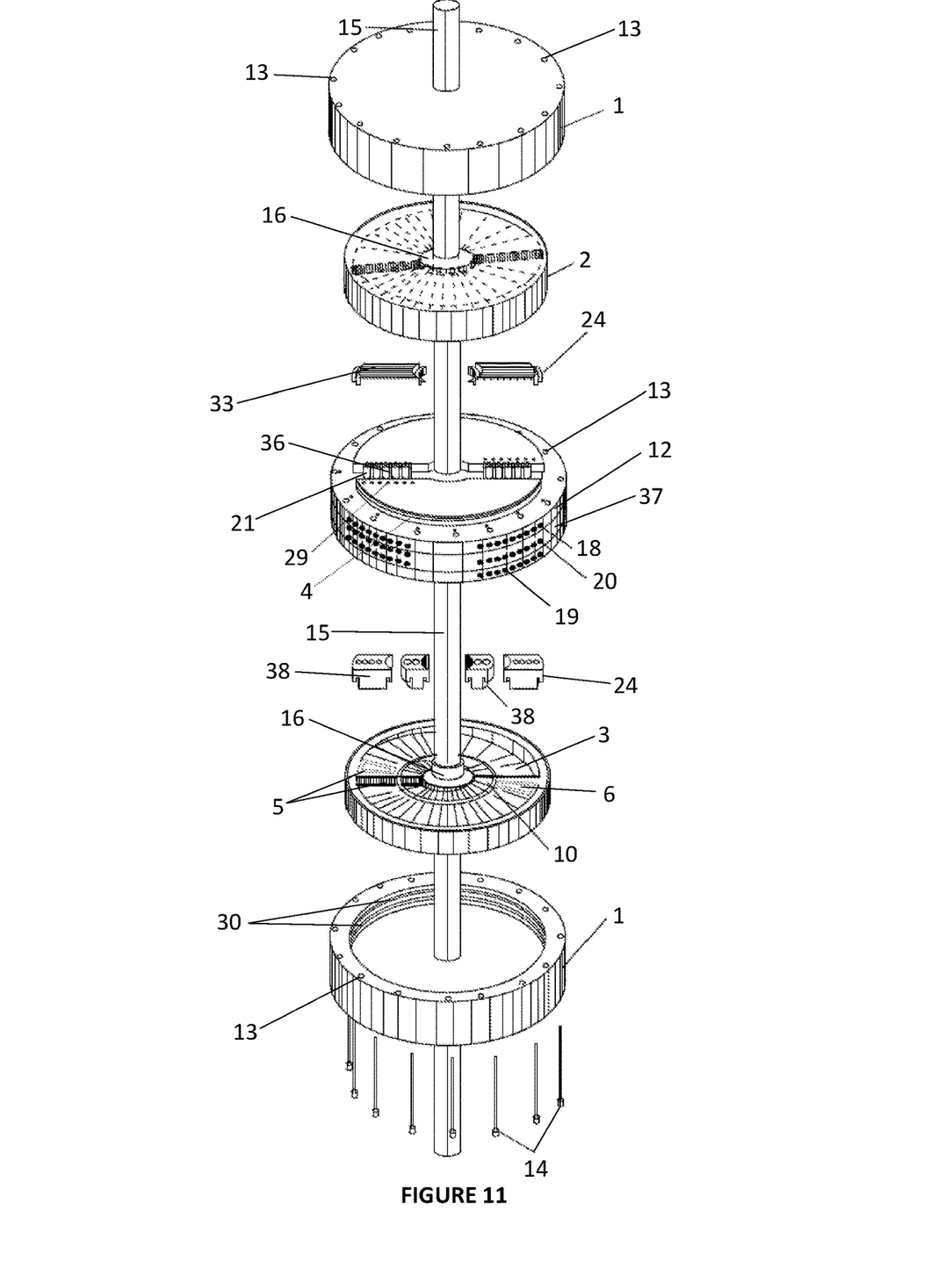
FIG. 11 shows an exploded perspective view of the parts that make up the external combustion rotary engine, with double housing.
Figure 12:
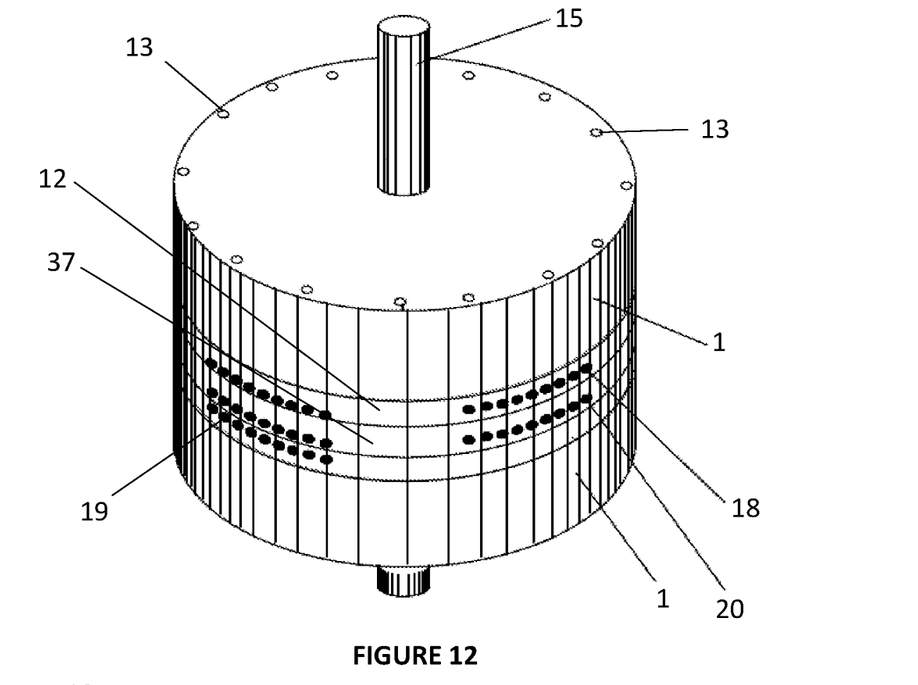
FIG. 12 shows an upper perspective view of the external combustion rotating engine, with double housing.
Figure 13:
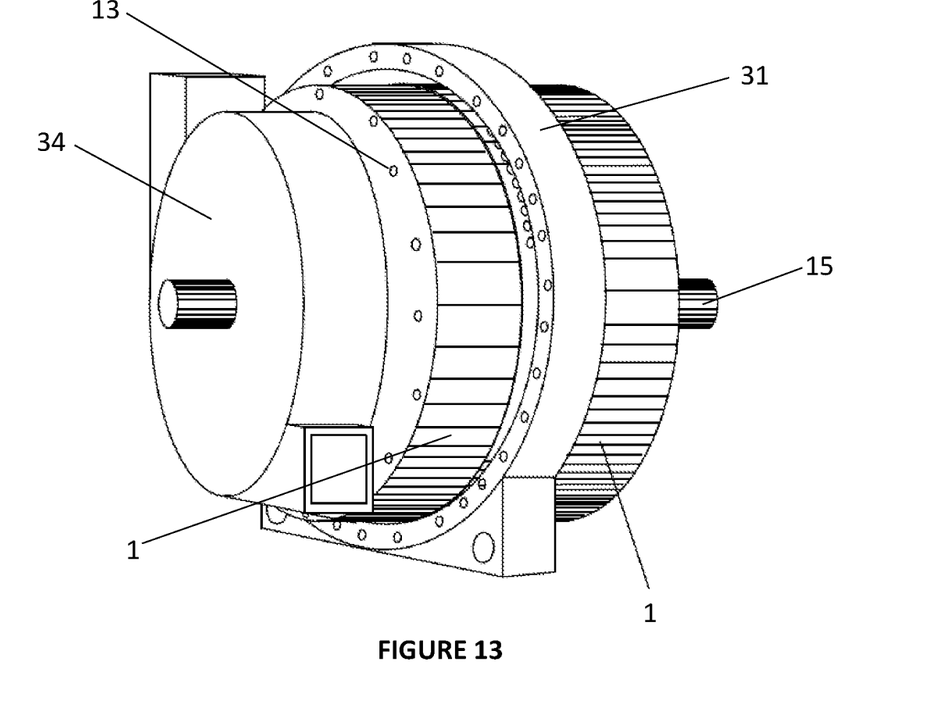
FIG. 13 shows a lateral perspective view of the external combustion rotary engine.

As can be seen in FIGS. 11, 12, and 13 in a variant of the present invention, the external combustion rotary engine has a second housing with the same characteristics as the housing (1), which has a hosted inside a second rotor with the same components as the rotor (2); The second housing is placed on the opposite side of the case (1) in such a way that the stators are in the center, being in contact each of them with the first stator (12) and the second stator (37) respectively; In such a way that the steam ducts (18), condensate ducts (19) and cooling ducts (20) are found on the outer periphery of the first stator (12) and the second stator (37) entering radially; Transfer ducts (29) are vertically crossing the thickness of the first stator (12) and the second stator (37).

The impulse track (3), the expansion track (8), the vacuum track (9), and the compression track (10), are distributed between the rotor (2) and the second rotor (not illustrated).

PREFERENTIAL REALIZATION OF THE INVENTION

Examples

The following examples illustrate a preferential way, how to carry out the realization of the present invention, so they should not be considered limitations of it.

Example 1. Commissioning and Electricity Generation of the External Combustion Rotary Engine Regarding the aforementioned figures, steam is supplied using the steam generation system (not illustrated) in the steam pipe (18) which enters the impulse track (3) exerting pressure on the track cams (5) and therefore the rotor (2) begins to turn; When the track cams (5) reach the pistons (38) the valve ducts (25) are aligned with the piston ducts (26) and the steam is released in the transfer duct (29) passing to the expansion track (8), at that time steam is injected again to the impulse track (3) to keep the rotor rotation speed constant (2).

Once the track cams (5) reach the pistons (38) again align the valve ducts (25) with the piston ducts (26) allowing the steam passage of the expansion track (8) to the transfer ducts (29) to reach the vacuum track (9), and the steam of the impulse track (3) is transferred to the expansion track (8), repeating the steam injection cycle in the impulse track (3).

When track cams (5) coincide with the pistons (38), the steam injection cycle and fluid transfer between tracks are repeated, and the fluid found on the vacuum track (9) is transferred to the compression track (10), where the condensate is compressed by track cams (5) to pressurize and send it in the next cycle to condensate ducts (19) and thus return the condensate to the steam generation system (not illustrated) and heat it to convert it once again into steam.

The cycles are repetitive every 180° degrees, achieving a constant turn in the rotor (2), where, this turn is transmitted to the engine shaft (15).

An electric generator (not illustrated) that is connected to the engine shaft (15) transforms the mechanical movement into electrical energy, which may be also stored in a kinetic accumulator for use immediately or later.

The invention claimed is:

1. An external combustion rotary engine that includes:
   at least, a housing (1) that is hollow in its upper part and has a hole in the center, and is configured to house a rotor (2) which has a hole in the center;
   an impulse track (3), an expansion track (8), a vacuum track (9) and a compression track (10) are installed concentrically aligned at the top of the rotor (2);
   at least, a guide (4) is installed on each side of the impulse track (3), of the expansion track (8), the vacuum track (9) and the compression track (10);
   at least, two track cams (5) are installed equidistantly in all the upper part of the impulse track (3), of the expansion track (8), of the vacuum track (9) and compression track (10);
   a lubricating crest (6) is installed at the top of each of the two track cams (5), and is configured to house a lubricant fluid inside;
   at least, two guide cams (7) are installed on the external sides of the guides (4) in alignment with track cams (5);
   at least, a cooling vein (11) crosses the rotor thickness (2) are installed on the side of each of the guides (4) of the tracks of said rotor (2);
   at least two stators called the first stator (12) and second stator (37) which have a hole in their center, are installed at the top of the housing (1), the first stator (12) is configured to assemble the lower part with the guides (4) and with the lubricating crest (6) of the track cams (5), the second stator (37) is installed at the top of the first stator (12);
   a plurality of boreholes (13) are placed on the periphery crossing the entire thickness of the housing (1), the first stator (12) and the second stator (37);
   a means of fastening (14) that are introduced into the boreholes (13); the means of fastening (14) are installed by crossing the housing (1), the first stator (12) and the second stator (37) through their respective central holes;
   a collar (16) is fixed on the engine shaft (15) in the central part of the rotor (2);
   at least, a mechanical seal (17) is installed in the central hole of the housing (1) and in the central hole of the second stator (37) where the engine shaft (15) is located;
   at least two steam ducts (18) cross the thickness of the first stator (12) and the second stator (37), at least two steam ducts are installed equidistantly in the direction of the impulse track (3);
   at least, two condensate ducts (19) cross the thickness of the first stator (12) and the second stator (37), and are installed equidistantly in the direction of the compression track (10);
   at least, a cooling pipeline (20) is placed aligned between the first stator (12) and the second stator (37) crossing its thickness;
   at least, two pistons (38) are installed equidistantly at the bottom of the first stator (12), aligned with the impulse track (3), the expansion track (8), the vacuum track (9) and the compression track (10); each of the two pistons (38) are made up of a container (23) and, at least, two compression cylinders (21) housed inside said container (23), which are fixed at the bottom of the first stator (12) through socket head screws (36);
   a spring (22), is installed inside each of the compression cylinders (21), the springs are installed at the bottom of the compression cylinders (21), which are aligned with container ducts (26) that are installed at the bottom of the container (23);
   a check valve (32) is installed at the bottom of the compression cylinders (21); a deflector (33) is installed at the bottom of each of the two pistons (38);
   a coupling arm (24) is installed at each of the side ends of the containers (23) of each of the two pistons (38), the respective coupling arms are assembled to the guides (4);
   an oblique seal (27) is diagonally installed at the bottom of the internal part of the containers (23);
   a piston lubrication duct (28) is installed at the top of the pistons (38); transfer ducts (29) are installed in the first stator (12);
   a plurality of bearings (30) are installed between the rotor (2) and the housing (1); crest lubrication ducts (35) are installed in the first stator (12) and the second stator (37) in alignment with the lubricant crest (6);
   an engine base (31) is placed around the housing (1), the first stator (12) and the second stator (37); and
   a hopper (34) is installed on the outside of the second stator (37) next to the engine base (31).

2. The external combustion rotary engine of claim 1 is characterized in that, the housing (1) is cylindrical.

3. The external combustion rotary engine of claim 1 is characterized in that, the rotor (2) is circular.

4. The external combustion rotary engine of claim 1 is characterized in that, the impulse track (3) is located on the outer periphery of the rotor (2), then the expansion runway (8) is located, followed by the vacuum track (9) and on the internal periphery of the rotor (2) the compression track is located (10).

5. The external combustion rotary engine of claim 1 is characterized in that, the guide (4) has a high relief.

6. The external combustion rotary engine of claim 1 is characterized in that, the lubricating crest (6) is prismatic.

7. The external combustion rotary engine of claim 1 is characterized in that, the cooling vein (11), the steam ducts (18), the condensate ducts (19), and the cooling duct (20) are cylindrical perforations.

8. The external combustion rotary engine of claim 1 is characterized in that, the first stator (12) and the second stator (37) are circles.

9. The external combustion rotary engine of claim 1 is characterized in that, steam pipelines (18), condensate ducts (19), and cooling ducts (20) are cylindrical perforations.

10. The external combustion rotary engine of claim 1 is characterized in that, the fastening means (14) are screws, studs, threaded rods, and/or a combination of the previously disclosed fastening means.

11. The external combustion rotary engine of claim 1 is characterized in that, the pistons (38) are prismatic.

12. The external combustion rotary engine of claim 11 is characterized in that, the prismatic form is rectangular.

13. The external combustion rotary engine of claim 12 is characterized in that, the steam ducts (18), the condensate ducts (19), and the cooling pipelines (20) are installed on the outer periphery of the first stator (12), and the second stator (37).

14. The external combustion rotary engine of claim 1 is characterized in that, the housing is a first housing (1), and the external combustion rotary engine further includes a second housing with the same components as the first housing (1), with the first and second stators are in the center.

15. The external combustion rotary engine of claim 14 is characterized in that, the transfer ducts (29) are vertically formed, crossing the thickness of the first stator (12) and the second stator (37).

16. The external combustion rotary engine of claims 14 is characterized in that, the rotor (2) is a first rotor (2); wherein the impulse track (3), the expansion track (8), the vacuum track (9), and the compression track (10), are distributed among the rotor (2) and a second rotor.

\* \* \* \* \*